(12) United States Patent
Wilkins

(10) Patent No.: US 9,290,219 B2
(45) Date of Patent: Mar. 22, 2016

(54) LOCOMOTION SYSTEM AND METHOD OF CONTROLLING A ROBOTIC DEVICE

(71) Applicant: The Boeing Company, Chicago, IL (US)

(72) Inventor: Donald F. Wilkins, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 227 days.

(21) Appl. No.: 13/826,646

(22) Filed: Mar. 14, 2013

(65) Prior Publication Data

US 2014/0262561 A1    Sep. 18, 2014

(51) Int. Cl.
*G01N 33/00* (2006.01)
*B62D 57/02* (2006.01)

(52) U.S. Cl.
CPC ............... *B62D 57/02* (2013.01); *Y10S 901/01* (2013.01)

(58) Field of Classification Search
CPC ........................... G01N 35/0099; G09G 3/002
USPC ......... 700/245; 403/384, 52, 13, 14; 600/332, 600/372, 424; 156/247, 161
See application file for complete search history.

(56) References Cited

U.S. PATENT DOCUMENTS

| | | | |
|---|---|---|---|
| 4,651,343 A | 3/1987 | Laor | |
| 6,110,247 A | 8/2000 | Birmingham et al. | |
| 6,317,206 B1 | 11/2001 | Wulf | |
| 6,585,442 B2 * | 7/2003 | Brei et al. | 403/13 |
| 7,195,872 B2 | 3/2007 | Agrawal et al. | |
| 7,884,530 B2 * | 2/2011 | Aizenberg et al. | 310/328 |
| 2002/0186956 A1 | 12/2002 | Lowry | |
| 2004/0122328 A1 | 6/2004 | Wang et al. | |
| 2007/0279367 A1 | 12/2007 | Kitai | |
| 2010/0053727 A1 | 3/2010 | Lee et al. | |
| 2012/0168233 A1 | 7/2012 | Clark | |
| 2012/0314445 A1 | 12/2012 | Masuda | |
| 2013/0172671 A1 * | 7/2013 | Rentschler et al. | 600/109 |
| 2014/0246321 A1 | 9/2014 | Tsukada et al. | |

FOREIGN PATENT DOCUMENTS

| | | |
|---|---|---|
| EP | 2177558 A1 | 4/2010 |
| WO | 2012059828 A2 | 5/2012 |
| WO | 2014078507 A1 | 5/2014 |

OTHER PUBLICATIONS

Moon, Myoung-Woon et al., Tilted Janus Polymer Pillars; Soft Matter, 2010, vol. 6, pp. 3924-3929.
Menguc, Yigit et al., Gecko-Inspired Controllable Adhesive Structures Applied to Micromanipulation, Adv. Funct. Mater., 22:1246-1254. doi: 10.1002/adfm.201101783.

(Continued)

*Primary Examiner* — Dalena Tran
(74) *Attorney, Agent, or Firm* — Armstrong Teasdale LLP

(57) ABSTRACT

A locomotion system for use with a robotic device is provided. The locomotion system includes a first micropillar array including at least a first micropillar, a second micropillar array including at least a second micropillar, a control circuit associated with each micropillar of the first and second micropillar arrays, and a controller operatively coupled to each control circuit. The controller is configured to selectively activate the first and second micropillars in a sequence that causes the robotic device to move in a predetermined direction.

20 Claims, 4 Drawing Sheets

(56) References Cited

OTHER PUBLICATIONS

Menguc, Yigit et al., Staying Sticky: Contact Self-Cleaning of Gecko-Inspired Fibrillar Adhesives, 2012, available at http://people.seas.harvard.edu/~ymenguc/research.html; last visited Feb. 25, 2013.
Rivas, Juan (2004). Radio Frequency dc-dc Power Conversion, (Doctorate thesis). Department of Electrical Engineering and Computer Science, Massachusetts Institute of Technology, Sep. 2006.
European Search Report issued in European Application No. 14156154.8 on Aug. 18, 2014, 9 pages.
Bright, V.M., et al., "Prototype Microrobots for Micro Positioning in a Manufacturing Process and Micro Unmanned Vehicles," Micro Electro Mechanical Systems, 1999. MEMS '99. Twelfth IEEE International Conference, Jan. 17-21, 1999, pp. 570-575.
Byungkyu, Kim et al., "A Ciliary Based 8-Legged Walking Micro Robot Using Cast IPMC Actuators," Proceedings / 2003 IEEE International Conference on Robotics and Automation, Sep. 14-19, 2003, pp. 2940-2945.
Liwei, Shi et al., "A Novel Soft Biometic Microrobot with Two Motion Attitudes," Sensors, vol. 12, No. 12, Dec. 6, 2012, pp. 16732-16758.
EPO Extended Search Report for related application No. 14155649.8-1553 dated Aug. 26, 2014, 7 pp.
EPO Extended Search Report for related application No. 141554683.3-1356 dated Sep. 19, 2014, 10 pp.
Liou, Dar-Sun et al., Axial Particle Displacements in Fluid Slugs After Passing a Simple Serpentiform Microchannel Nicrofluid Nanofluid, 2009, 7:145-148.
Xu, J., et al., Microphone Based on Polyvinylidene Flouride (PVDF) Micro-Pillars and Patterned Electrodes, Sensors and Actuators, 2009, A153:24-32.
Gallego-Perez, Daniel et al., Versatile Methods for the Fabrication of Polyvinylidene Fluoride Microstructures, Biomed Microdevices, 2010, 12:1009-1017.
Hofling, S. et al., Semiconductor Quantum Light Emitters and Sensors, Quantum Sensing and Nanophotonic Devices VII, Proc. of SPIE vol. 7608, pp. 760804-1-760804-9, © 2010 SPIE.
Ghanbari, A. et al., A Micropillar-based On-chip System for Continuous Force Measurement of *C. elegans*, Journal of Micromechanics and Microengineering, Published Jul. 26, 2012, pp. 1-10, © 2012 IOP Publishing Ltd.
Chan, Yu Fei et al., Electroluminescence from ZnO-Nanofilm/Simicropillar Heterostructure Arrays, Optics Express, vol. 20, No. 22, pp. 24280-24287, 2012.
Microfluids; http://www.imec.bc/ScientificReport/SR2010/2010/1159254.html; 6 pages; 2010; retrieved from internet Jan. 14, 2013.
Hiraoka, M. et al; Integrated Fluidic System for Bio-Molecule Separation; 32nd Annual International Conference of IEEE EMBS; pp. 6514-6517; Buenos Aires, Argentina; Aug. 31-Sep. 4, 2010.
Cheng, D. et al.; A Sensing Device Using Liquid Crystal in a Micropillar Array Supporting Structure; Journal of Microelectromechanical Systems; vol. 18, No. 5; pp. 973-982; Oct. 2009.
EP Extended Search Report for related matter 14155371.9 dated May 15, 2015; 9 pp.
Zhang, Yang et al.; MEMS Optical Acoustic Sensors Manufactured in Laminates; Electronic Components and Technology Conference (ECTC), 2011 IEEE 61st, IEEE, May 31, 2011, pp. 230-235.
Long, Zhou; Newly-Developed Nanostructured Microcantilever Arrays for Gas-Phase and Liquid-Phase Sensing; Graduate School; Doctoral Dissertations; May 1, 2010; pp. 1-133.
Xu, T. et al.; Polymeric Micro-Cantilever Array for Auditory Front-End Processing; Sensors and Actuators A; 2004; vol. 114; pp. 176-182. date is not available.
Fritz, J. et al.; Translating Biomolecular Recognition into Nanomechanics; Science Magazine; Apr. 14, 2000; vol. 288; pp. 316-319.
Tan, John L. et al., Cells Lying on a Bed of Microneedles: An Approach to Isolate Mechanical Force, PNAS, vol. 100, No. 4, Feb. 18, 2003, pp. 1484-1489.
Sniadecki et al., Magnetic Microposts as an Approach to Apply Forces to Living Cells, PNAS, vol. 104, No. 37, Sep. 11, 2007, pp. 14553-14558.
Canada Office Action for related application 2,841,564 dated Nov. 27, 2015; 3 pp.

\* cited by examiner

LOCOMOTION SYSTEM AND METHOD OF CONTROLLING A ROBOTIC DEVICE

BACKGROUND

The present disclosure relates generally to the field of robotics and, more specifically to locomotive systems for use in propelling a robotic device.

Robotics generally refers to the design, construction, and operation of electro-mechanical machines, or robots. At least some known robots include electrical circuitry configured to control mechanical elements of the robot, and robots may be designed to perform undesirable and/or dangerous functions that humans may be unable or do not wish to perform. Recent advances in micro and nano-sized electro-mechanical systems enable robots to be fabricated in increasingly smaller sizes. At least some known miniature robots may be sized to operate in environments that are inaccessible to humans, such as tight passages and/or in situations where the use of heavy equipment would be undesirable or may not be possible.

Known miniature robots are generally mobile and may be propelled by a variety of means. For example, at least some known miniature robots are propelled by a tank-tread system or by an automated leg system. While these systems are generally suitable for moving a miniature robot, such means of propulsion may be disproportionately large when compared to the robot being moved, may consume a disproportionate amount of power, and/or may be susceptible to wear and break down. For example, at least some known propulsion systems include a plurality of moving parts such as motors, levers, and belts. Fabricating these known moving parts in increasingly small sizes to accommodate use of such propulsion systems in miniature robots may result in an increased frequency of break down of parts used therein.

BRIEF DESCRIPTION

In one aspect, a locomotion system for use with a robotic device is provided. The locomotion system includes a first micropillar array including at least a first micropillar, a second micropillar array including at least a second micropillar, a control circuit associated with each micropillar of the first and second micropillar arrays, and a controller operatively coupled to each control circuit. The controller is configured to selectively activate the first and second micropillars in a sequence that causes the robotic device to move in a predetermined direction.

In another aspect, a robotic device is provided. The robotic device includes a platform and a locomotion system coupled to the platform. The locomotion system includes a plurality of micropillar arrays that each include at least one micropillar, a control circuit associated with each micropillar of the plurality of micropillar arrays, and a controller operatively coupled to the control circuits. The controller is configured to selectively activate the micropillars in a sequence that causes said platform to move in a predetermined direction.

In yet another aspect, a method for controlling a robotic device is provided. The robotic device includes a platform and a locomotion system coupled to the platform. The locomotion system includes a plurality of micropillar arrays that each include at least one micropillar, a control circuit associated with each micropillar of the plurality of micropillar arrays, and a controller operatively coupled to the control circuits. The method includes selecting at least one of the micropillars of the plurality of micropillar arrays, and activating the at least one of the micropillars to move the robotic device in a predetermined direction.

DETAILED DESCRIPTION

Implementations of the present disclosure relate to a locomotion system that may be used to propel a robotic device, and methods of controlling the robotic device. As used herein, the term "robotic device" refers to a robotic device of any suitable size such as, but not limited to, robotic devices with characteristic dimensions less than about 10 centimeters (minirobot), robotic devices with characteristic dimensions less than about 1 centimeter (minirobot), robotic devices with characteristic dimensions less than about 1 millimeter (microrobot), and robotic devices with characteristic dimensions less than about 1 micrometer (nanorobot).

In the exemplary implementation, the locomotion system described herein includes a plurality of micropillars coupled to the robotic device, and the micropillars are used to propel the robotic device in a predetermined direction when activated. In the exemplary implementation, the micropillars are activated when subjected to stimuli and are deactivated when the stimuli is removed. In some implementations, the micropillars are fabricated from a piezoelectric material and/or a shape memory alloy (SMA). Accordingly, a micropillar fabricated from piezoelectric material is activated when a voltage is applied, and is deactivated when the voltage is removed, and a micropillar fabricated from SMA material is activated as the SMA material cools and is deactivated when the SMA is heated. Activation bends the micropillars in a predetermined direction, and deactivation enables them to straighten to their original orientation wherein the micropillars are reset for further use in propelling the robotic device. As such, the present disclosure provides a locomotion system that facilitates reducing the number of moving parts required to propel a robotic device as compared to known locomotion systems.

Figure 1:
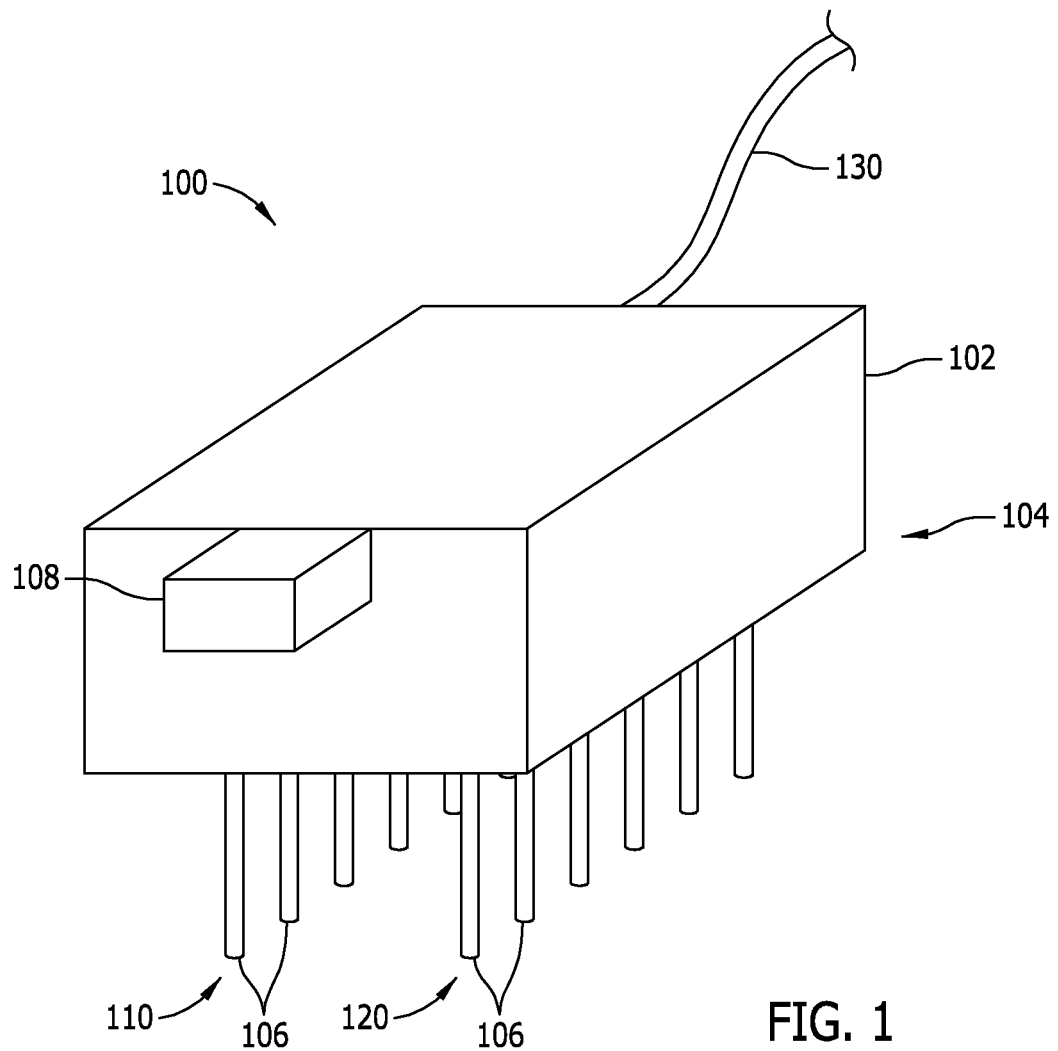
FIG. 1 is a perspective schematic view of an exemplary robotic device.

FIG. 1 is a perspective schematic view of an exemplary robotic device 100. In the exemplary implementation, robotic device 100 includes a body 102 and a locomotion system 104 coupled to body 102. Locomotion system 104 includes a first array and/or row 110 of micropillars 106 and a second and/or row 120 of micropillars 106 that are coupled, either directly or indirectly, to body 102. While shown as including two rows of micropillars, any suitable number of rows of micropillars may be coupled to body 102 that enables robotic device 100 to function as described herein. Moreover, micropillars 106 may be arranged in any suitable configuration that enables robotic device 100 to function as described herein. In alternative implementations, body 102 has a substantially cylindrical shape, and micropillars 106 are spaced circumferentially about body 102.

Micropillars 106 may be fabricated from any suitable material that enables locomotion system 104 to function as described herein. More specifically, micropillars 106 may be fabricated from any suitable material that enables micropillars 106 to bend when subjected to stimuli, such as electricity or heat. For example, micropillars 106 may be fabricated from piezoelectric material or shape memory alloy (SMA) material. Examples of suitable piezoelectric material include, but are not limited to, naturally-occurring crystalline material, synthetic crystalline material, and synthetic ceramic material. Examples of suitable SMA material include, but are not limited to, silver-cadmium alloys, copper-zinc alloys, nickel-titanium alloys, copper-tin alloys, and copper-aluminum-nickel alloys. In the exemplary implementation, micropillars 106 are fabricated from piezoelectric material. Further, micropillars 106 may have any suitable dimensions that enable locomotion system 104 to function as described herein. More specifically, micropillars 106 may be fabricated in the micrometer and sub-micrometer ranges. Further, the dimensions of micropillars 106 may be dependent on the size and weight of robotic device 100, and the load that can be supported by the material used to fabricate micropillars 106.

In operation, micropillars 106 may be activated and deactivated in any suitable sequence that enables robotic device 100 to be propelled in a predetermined direction. More specifically, micropillars 106 in first row 110 and micropillars 106 in second row 120 may be activated and deactivated in a continuous series that extends longitudinally along the length of robotic device 100. In one implementation, robotic device 100 is propelled by simultaneously activating at least one micropillar 106 in first row 110 and at least one micropillar 106 in second row 120. In another implementation, robotic device 100 is propelled by only activating micropillars 106 in either first row 110 or second row 120 at a time. In yet another implementation, robotic device 100 is propelled by activating and deactivating all micropillars 106 in first row 110 followed by activating and deactivating all micropillars 106 in second row 120. As such, the sequential activation and deactivation of micropillars 106 is continuously repeated until robotic device 100 reaches its desired destination.

In the exemplary implementation, robotic device 100 also includes an instrument 108 coupled to body 102 and a cable 130 extending from robotic device 100. In some implementations, instrument 108 collects data relating to the conditions surrounding robotic device 100 during operation, and cable 130 transfers the data to any suitable receiving device (not shown) or to an operator of robotic device 100. Exemplary suitable instruments 108 include, but are not limited to, sensors that measure conditions such as temperature and pressure, and/or a camera. In one implementation, cable 130 is fabricated from optical fibers that enable light shining therethrough to be reflected back to the operator to provide a visual representation of the surrounding environment. In alternative implementations, instrument 108 provides feedback to the operator through a wireless link.

Figure 2:
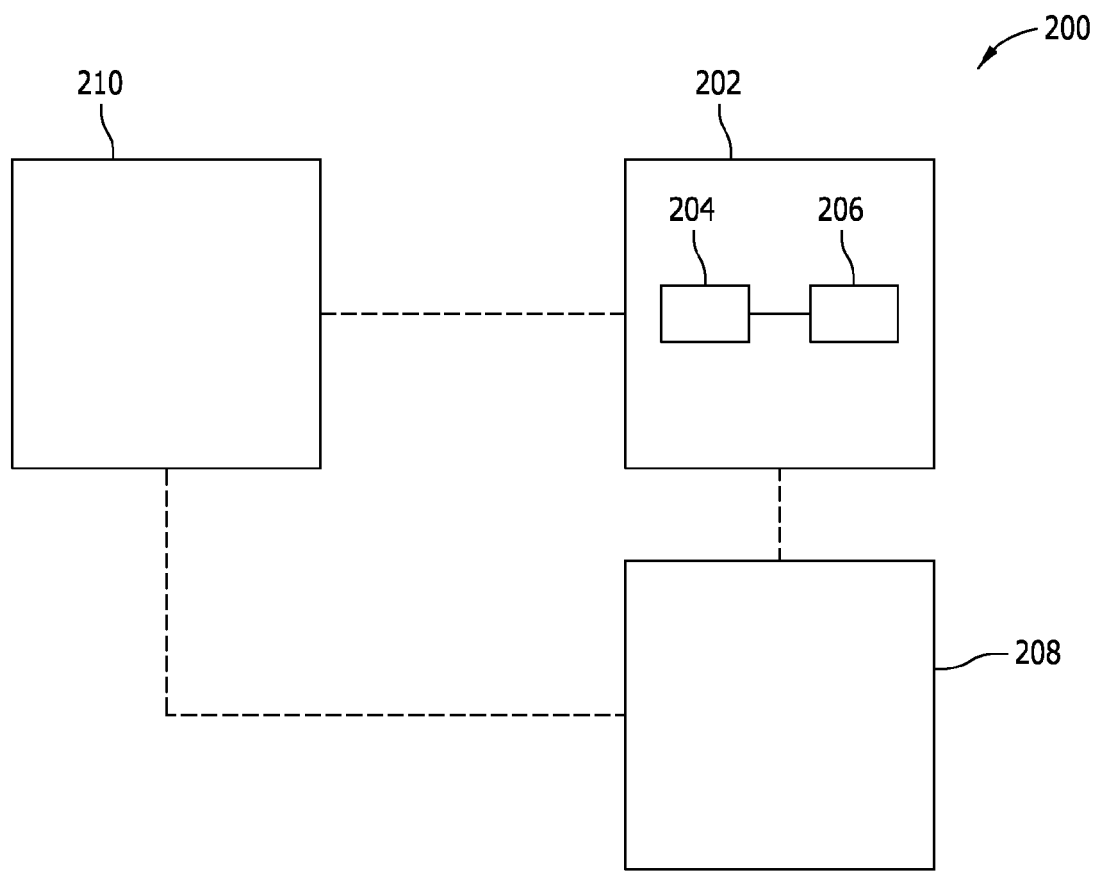
FIG. 2 is a schematic illustration of an exemplary control system that may be used with the robotic device shown in FIG. 1.
Figure 3:
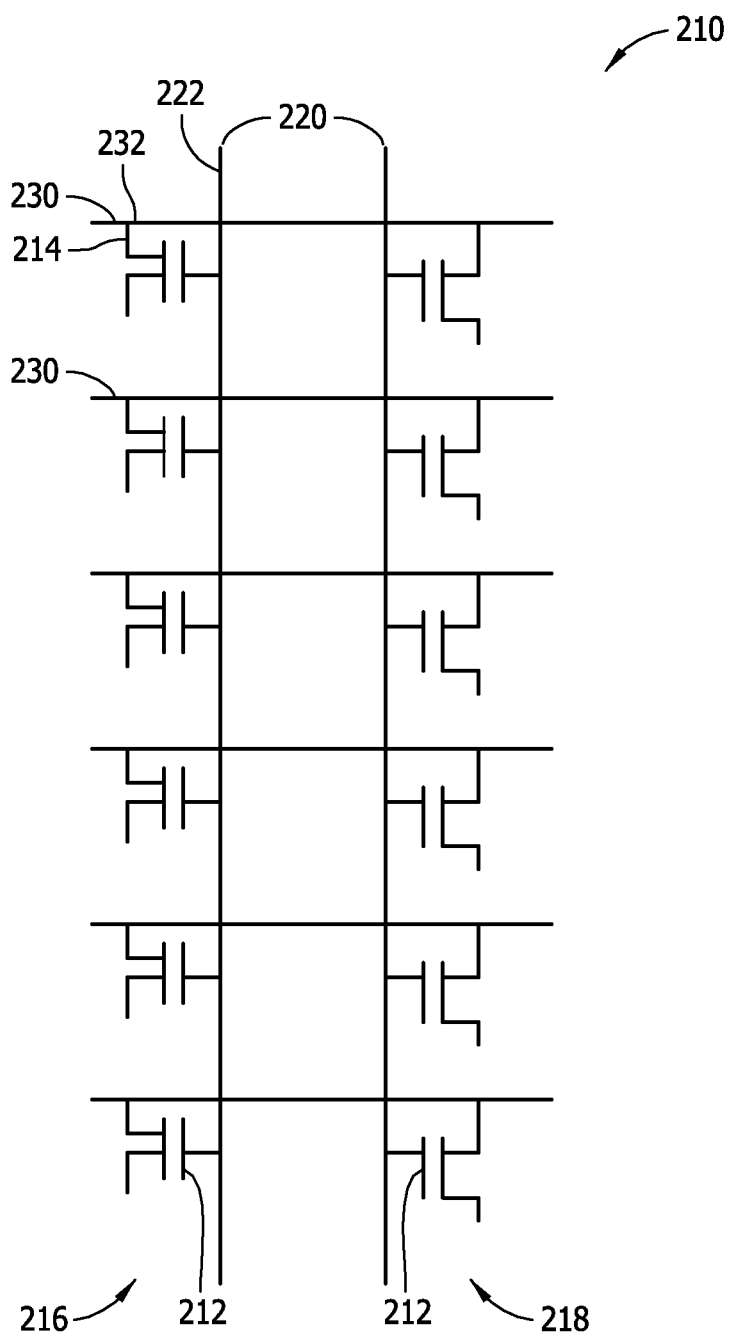
FIG. 3 is a schematic illustration of an exemplary selection matrix that may be used with the control system shown in FIG. 2.

FIG. 2 is a schematic illustration of an exemplary control system 200 that may be used with robotic device 100 (shown in FIG. 1), and FIG. 3 is a schematic illustration of an exemplary selection matrix 210 that may be used with control system 200. In the exemplary implementations, locomotion system 104 uses control system 200 to selectively activate and deactivate micropillars 106 (shown in FIG. 1). More specifically, when micropillars 106 are fabricated from piezoelectric material, control system 200 includes a selection matrix 210, and a controller 202 that is coupled to selection matrix 210. As such, controller 202 selectively activates micropillars 106 in a sequence that propels robotic device 100 in a predetermined direction.

In some implementations, controller 202 includes a memory device 204 and a processor 206 coupled to memory device 204 for use in executing operating instructions for use by robotic device 100. More specifically, in the exemplary implementation, memory device 204 and/or processor 206 are programmed to perform one or more operations described herein, such as controlling propulsion of robotic device 100. For example, processor 206 may be programmed by encoding an operation as one or more executable instructions and by providing the executable instructions in memory device 204. In an alternative implementation, the propulsion of robotic device 100 is controlled by a remote device (not shown).

Processor 206 may include one or more processing units (e.g., in a multi-core configuration). As used herein, the term "processor" is not limited to integrated circuits referred to in the art as a computer, but rather broadly refers to a controller, a microcontroller, a microcomputer, a programmable logic controller (PLC), an application specific integrated circuit, and other programmable circuits.

In the exemplary implementation, memory device 204 includes one or more devices (not shown) that enable information such as executable instructions and/or other data to be selectively stored and retrieved. In the exemplary implementation, such data may include, but is not limited to, positional data, directional data, GPS data, map data, blueprint data, floor plan data, operational data, and/or control algorithms. Alternatively, control system 200 may be configured to use any algorithm and/or method that enable the methods and systems to function as described herein. Memory device 204 may also include one or more computer readable media, such as, without limitation, dynamic random access memory (DRAM), static random access memory (SRAM), a solid state disk, and/or a hard disk.

In the exemplary implementation, selection matrix 210 includes a control circuit 212 associated with each micropillar 106, and controller 202 is coupled to control circuits 212 to enable robotic device 100 to be propelled in a predetermined direction. More specifically, selection matrix 210 includes a first array and/or row 216 of control circuits 212 associated with the first array and/or row 110 of micropillars 106, and a second array and/or row 218 of control circuits 212 associated with the second array and/or row 120 of micropillars 106. Selection matrix 210 also includes a plurality of longitudinal conductive lines 220 and a plurality of traversing conductive lines 230 that intersect at respective control circuits 212. Accordingly, the number of conductive lines 220 and 230 used in selection matrix 210 correspond to the number of control circuits 212 used to operate micropillars 106.

In operation, selection matrix 210 selectively applies voltages across longitudinal conductive lines 220, and selectively applies grounds across traversing conductive lines 230. As such, voltages and grounds are selectively applied across conductive lines 220 and 230 to activate micropillars 106 coupled to respective control circuits 212. For example, a first control circuit 214 is activated when voltage is applied across a first longitudinal conductive line 222 and when a first traversing conductive line 232 is grounded. As such, selection matrix 210 provides a suitable voltage to control circuits 212 to activate associated micropillars 106 in any suitable sequence that propels robotic device 100. In one implementation, selection matrix 210 is an active matrix array.

In the exemplary implementation, a power source 208 supplies power to robotic device 100. More specifically, power source 208 may be used to supply power to at least one instrument 108 (shown in FIG. 1) or to control circuits 212. Power source 208 may be any suitable power supply that enables robotic device 100 to function as described herein. In some implementations, power source 208 may be coupled to, or remote from, robotic device 100. A power source 208 coupled to robotic device 100 may be any suitable power supply such as, but not limited to, a solar panel, and a lithium-ion battery. A power source 208 that is remote from robotic device 100 may be any suitable power supply, and may supply power to robotic device 100 through either a wired or wireless link.

In one implementation, cable 130 (shown in FIG. 1) transfers power from power source 208 to robotic device 100. More specifically, in one implementation, cable 130 includes one or more optical fibers, and light is directed through cable 130 towards a solar panel (not shown) coupled to robotic device 100. The solar panel then converts the light energy into the power used to activate control circuits 212. In an alternative implementation, power may be provided to robotic device 100 through a radiofrequency transmission. Further, in the exemplary implementation, the voltage required to activate micropillars 106 is defined within a range of from about 0.5 millivolts per Newton (mV/N) to about 2.0 mV/N, and current required to activate micropillars 106 is defined within a range of from about 10 milliamps (mA) to about 30 mA.

Figure 4:
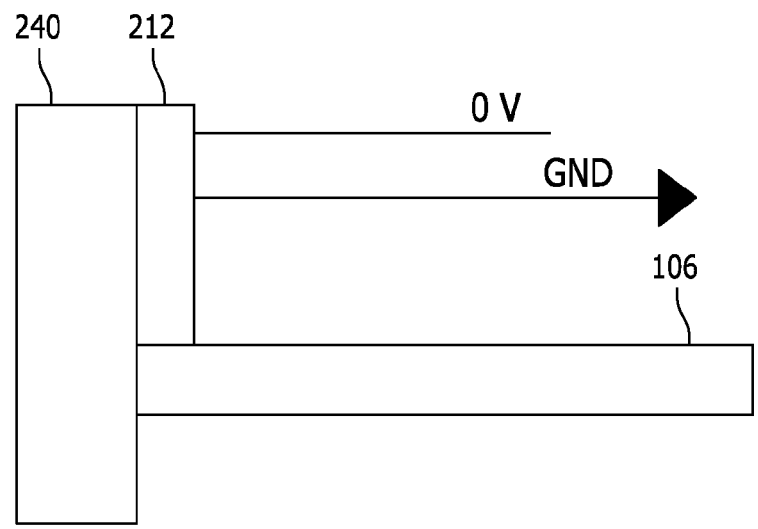
FIG. 4 is an enlarged side view of an exemplary micropillar that may be used with the robotic device shown in FIG. 1 in a first operational position.
Figure 5:
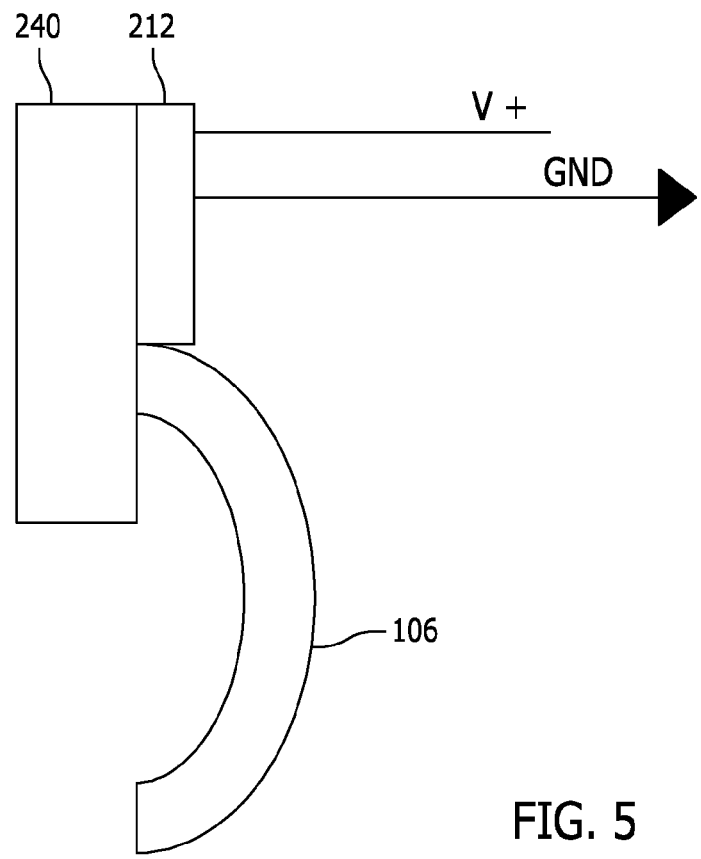
FIG. 5 is an enlarged side view of the micropillar shown in FIG. 4 in a second operational position.

FIG. 4 is an enlarged side view of an exemplary micropillar 106 in a first operational position, and FIG. 5 is an enlarged side view of micropillar 106 in a second operational position. In the exemplary implementations, micropillar 106 is coupled to and extends from a substrate 240, and control circuit 212 is coupled to substrate 240 adjacent to micropillar 106. In some implementations, control circuit 212 includes one or more thin film transistors (TFT) (not shown) deposited onto substrate 240 by an electron beam-lithographic or photolithographic process. Substrate 240 is then coupled to body 102 (shown in FIG. 1) such that micropillars 106 are arranged in any suitable configuration.

In the exemplary implementation, micropillars 106 are selectively activated in a sequence that propels robotic device 100 in a predetermined direction. For example, when robotic device 100 is at rest as shown in FIG. 1, micropillars 106 have a substantially straight orientation. To propel robotic device 100, micropillars 106 are configured to bend when activated, and configured to return to the substantially straight orientation when deactivated. As such, in one implementation, body 102 shifts towards the activated, bent micropillar 106 to move robotic device 100 in that direction.

Micropillars 106 are activated and deactivated by applying and removing any suitable stimuli thereto. For example, in the exemplary implementation, micropillar 106 is fabricated from piezoelectric material, and micropillar 106 is activated by applying a voltage to control circuit 212 as described above. More specifically, the piezoelectric material responds to the applied voltage, which bends micropillars 106 in a direction opposite the applied voltage in the second operational position. Micropillars 106 then return to the substantially straight first operational position when the voltage is removed.

The locomotion system described herein enables a robotic device to be propelled easily and efficiently in a predetermined direction. More specifically, the locomotion system includes rows of micropillars that function as legs for the robotic device. The micropillars are selectively activated in a sequence that facilitates propelling the robotic device in the predetermined direction. More specifically, the micropillars are activated when subjected any suitable stimuli and, in the exemplary implementation, bend when activated to cause the robotic device to shift towards the bent micropillar. By sequentially controlling the activation of each micropillar, the robotic device may be directed to travel in any direction. As such, robotic devices of increasingly small sizes may be propelled using the locomotion system described herein that is simplified, includes less moving parts, and thus is more reliable than other known forms of locomotive propulsion used in robotic devices.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A locomotion system for use with a robotic device, said locomotion system comprising:
   a first array of micropillars, wherein said first array comprises at least a first micropillar;
   a second array of micropillars, wherein said second array comprises at least a second micropillar;
   a control circuit associated with each said micropillar of said first and said second arrays; and
   a controller operatively coupled to each said control circuit, said controller configured to selectively activate said first and said second micropillar in a sequence that causes the robotic device to move in a predetermined direction, wherein said first and said second micropillar bend when activated by said controller.

2. The locomotion system in accordance with claim 1, wherein said control circuit comprises a voltage control circuit, wherein a voltage is applied to said voltage control circuit to activate said micropillars.

3. The locomotion system in accordance with claim 2, wherein said first and said second micropillar bend in a direction opposite the applied voltage when activated and straighten when deactivated.

4. The locomotion system in accordance with claim 1, wherein said first and said second micropillar are fabricated from at least one of a piezoelectric material and a shape memory alloy.

5. The locomotion system in accordance with claim 1, wherein at least one micropillar of said first array and at least one micropillar of said second array are activated simultaneously to cause the robotic device to move in the predetermined direction.

6. The locomotion system in accordance with claim 1, wherein each control circuit is coupled to a plurality of conductive lines arranged in a matrix, wherein voltages and grounds are selectively applied across the plurality of conductive lines to activate said first and said second micropillar.

7. The locomotion system in accordance with claim 6, wherein the matrix comprises an active matrix array.

8. A robotic device comprising:
   a platform; and
   a locomotion system coupled to said platform, said locomotion system comprising:
      a plurality of arrays of micropillars, wherein each array comprises at least one micropillar;

a control circuit associated with each said micropillar of said plurality of micropillar arrays; and a controller operatively coupled to said control circuits, said controller configured to selectively activate each said micropillar in a sequence that causes said platform to move in a predetermined direction, wherein each said micropillar bends when activated by said controller.

9. The robotic device in accordance with claim 8, wherein said micropillars are activated in a continuous series down a length of said platform.

10. The robotic device in accordance with claim 8 further comprising a power source configured to apply a voltage to said control circuits to activate at least one predetermined micropillar.

11. The robotic device in accordance with claim 10, wherein said power source is remote from said platform and provides power to the robotic device through at least one of a wired link and a wireless link.

12. The robotic device in accordance with claim 11, wherein power is supplied to the robotic device with a radiofrequency transmission.

13. The robotic device in accordance with claim 10, wherein said micropillars bend in a direction opposite the applied voltage when activated and straighten when deactivated.

14. The robotic device in accordance with claim 8 further comprising an instrument coupled to said platform that is configured to collect data on conditions surrounding the robotic device.

15. The robotic device in accordance with claim 8, wherein each said control circuit is coupled to a plurality of conductive lines arranged in a matrix, wherein voltages and grounds are selectively applied across the plurality of conductive lines to activate said micropillars.

16. A method for controlling a robotic device that includes a platform and a locomotion system coupled to the platform, wherein the locomotion system includes a first array of micropillars and a second array of micropillars, a control circuit associated with each micropillar of the arrays, and a controller operatively coupled to the control circuits, said method comprising:

selecting at least one of the micropillars of the arrays; and activating the at least one of the micropillars to move the robotic device in a predetermined direction, wherein activating at least one of the micropillars includes bending the at least one micropillar.

17. The method in accordance with claim 16, wherein activating the at least one of the micropillars comprises applying a voltage to the control circuit such that the at least one of the micropillars bend in a direction opposite the applied voltage.

18. The method in accordance with claim 17, wherein applying a voltage comprises supplying the voltage from a power source that is remote from the platform and at least one of wired and wirelessly linked with the platform.

19. The method in accordance with claim 16, wherein activating the at least one of the micropillars comprises selectively applying voltages and grounds to a plurality of conductive lines associated with each control circuit.

20. The method in accordance with claim 16, wherein selecting at least one of the micropillars comprises selecting a micropillar from each array simultaneously.

\* \* \* \* \*